Sheet 1 - 2 Sheets

C. H. McCormick.

Mower.

No 823 Reissued Sep. 20, 1859.

C. H. McCormick.

Mower.

No 823 Reissued Sep. 20, 1859.

UNITED STATES PATENT OFFICE.

CYRUS H. McCORMICK, OF CHICAGO, ILLINOIS.

IMPROVEMENT IN REAPING-MACHINES.

Specification forming part of Letters Patent No. 5,335, dated October 23, 1847; Reissue No. 239, dated May 24, 1853; Reissue No. 637, dated December 21, 1858; Reissue No. 823, dated September 20, 1859.

DIVISION H.

*To all whom it may concern:*

Be it known that I, CYRUS H. McCORMICK, of Chicago, in the county of Cook and State of Illinois, have invented a new and useful Improvement in Reaping-Machines, of which the following is a full, clear, and exact description, reference being had to the accompanying drawings, making part of this specification, in which—

Figure 1:
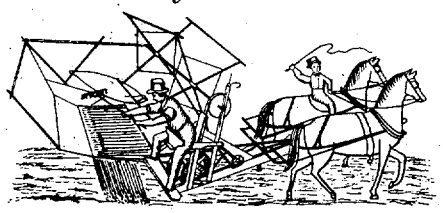
Figure 2:
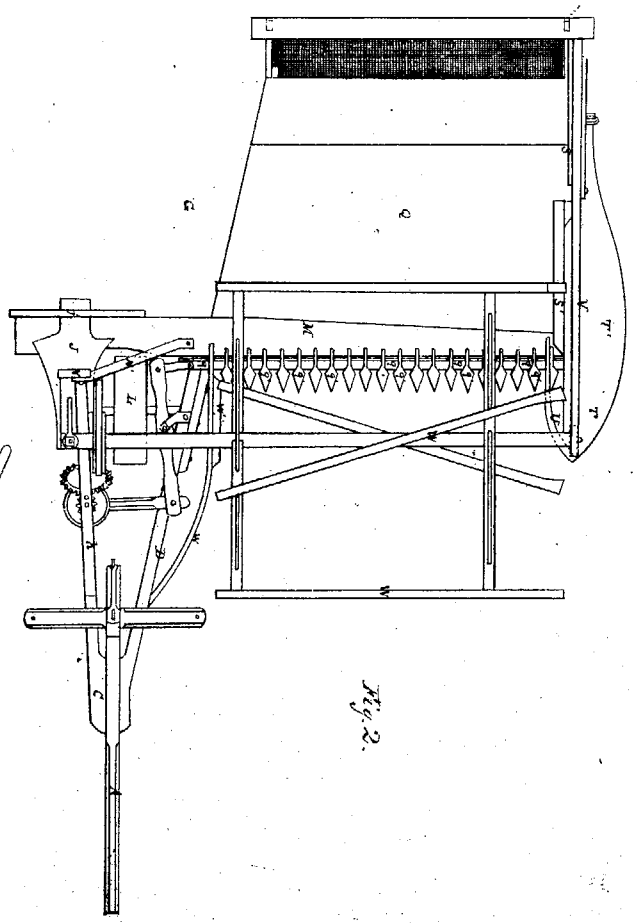
Figure 3:
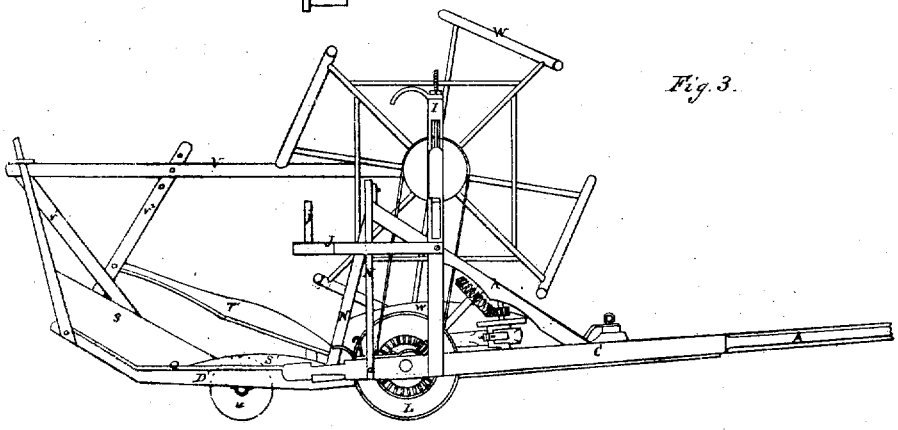
Figure 4:
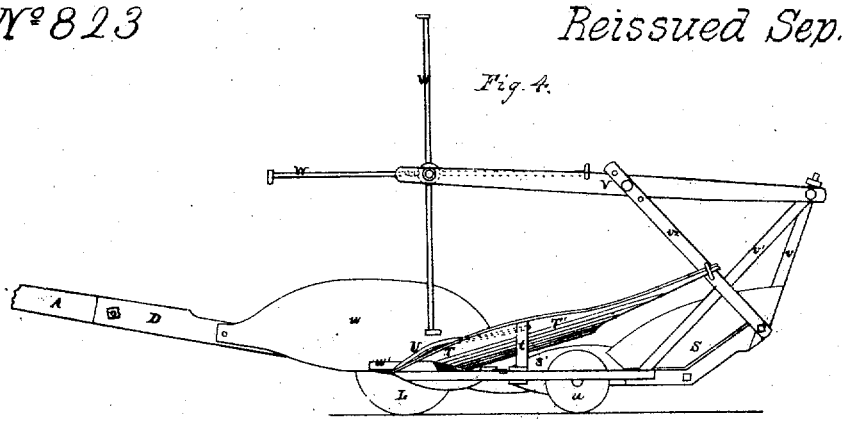
Figure 5:
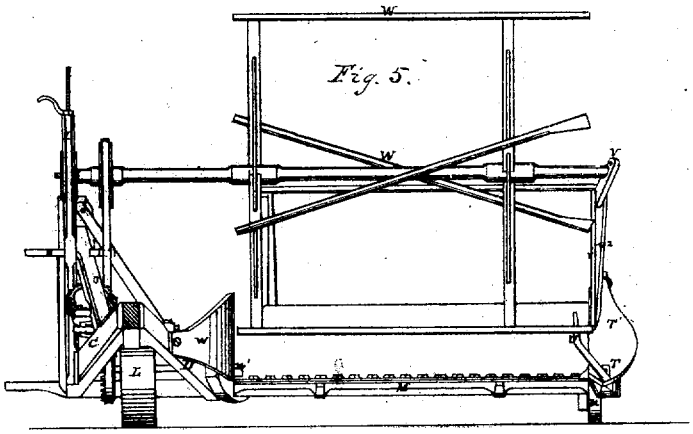
Figure 6:
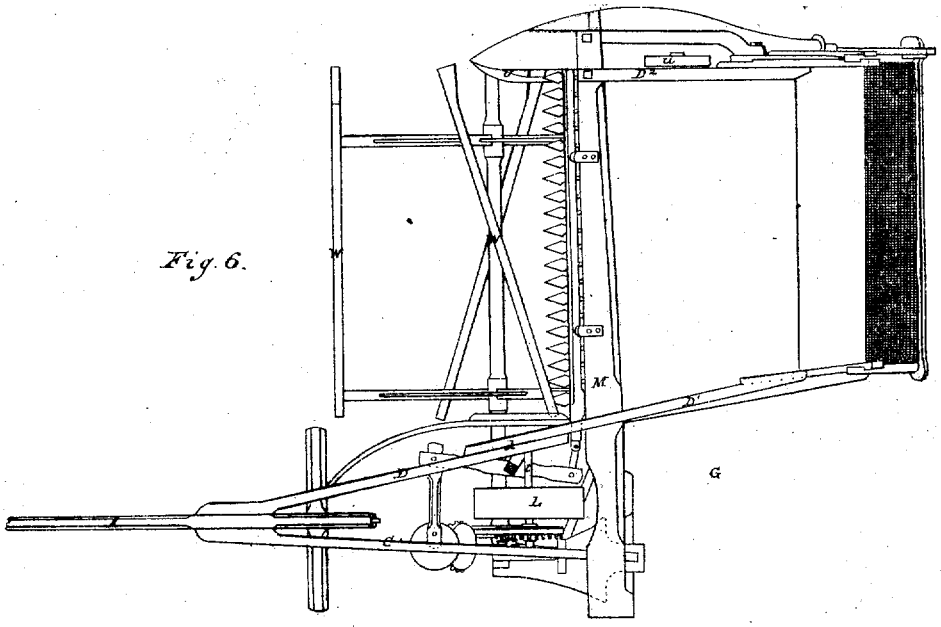

Figure 1 represents in perspective a side-draft-reel reaping-machine embracing my said improvement. Fig. 2 represents a plan of such a machine as seen from above. Fig. 3 represents an elevation of the inner side of the machine. Fig. 4 represents an elevation of the outer side of the machine. Fig. 5 represents an elevation of the front of the machine, and Fig. 6 represents a view of the under side of the machine.

That side of the machine to which the horses are attached, and which runs next the stubble, I call the "inner" side, and the opposite side of the machine, which runs next the uncut grain, I call the "outer" side, of the machine.

In the drawings I have shown the improvement claimed under this patent applied to a McCormick reaping-machine, but deem it unnecessary to describe in detail any more of that machine than is needful to a proper understanding of this improvement.

When a reaping-machine is used to cut a field of grain the stalks of which have been inclined and twisted in various directions by storms or otherwise, it is necessary that the divider of the machine, in order to work with the best effect, should have at least two acting dividing sides or lines diverging from each other to part the tangled stalks between which they enter, and that one at least of these lines should rise at a considerable angle, to elevate leaning stalks; but it is preferable to have both lines rise, the outer one at a comparatively high angle and the inner one at least sufficiently to raise the stalks to the cutter and for the attachment of a shoe between its front extremity and the end of the finger-beam, to prevent the beam, with the fingers and the cutter, from running too near the ground.

Where a divider is made of open frame-work, as in my patents of 1834 and 1845, crooked and leaning stalks of grain are apt to become entangled, and to accumulate upon the frame-work and escape through the opening and fall outside of the platform; but while this open-work has the advantage of making a large divider of light weight, this advantage may be attained without the use of open-work, and without materially increasing the weight of the divider, by employing in its construction some thin material having a solid surface—as a thin board made of a wedge shape—and placing such thin wedge-shaped piece at the outer end of the finger-beam, with its point at the usual height and projecting in advance of the cutter, and with its upper surface inclined lengthwise and crosswise to bring its outer edge into position to form the outer operating line of the divider, and its inner edge into position to form the inner dividing-line, thus producing a light divider of large size, with inner and outer operating lines or edges without any open space between them.

In the accompanying drawings, M represents a strong beam, called the "finger-piece" or "finger-beam." On the front of the outer portion of this beam the cutting apparatus is placed, and behind the cutting apparatus is the platform Q. At the outer end of the finger-beam there is a board, T, fixed in such a position lengthwise and transversely that its outer edge rises as it extends backward, and diverges at the same time from the inner edge, so as to press out and raise inward-leaning stalks that stand outside of the line in which the point of the board advances. This board is supported by a slanting bracket, *t*, Fig. 5. This improved divider contains an outside edge or line, which extends from before the cutter backward and bears the standing grain away from the machine, combined with a surface sloping downward from this line toward the platform, preventing grain, when cut, from dropping to the ground, and by its inclination guiding grain falling on it to the platform; also an inside edge or line at the lower margin of the sloping surface, to bear stalks inward from the line of division.

The reel is placed above and in advance of the cutter, and at its outer end is supported by an arm, V, and at its inner end by a post, I, and is so arranged with respect to the divider that the outer ends of its bars or ribs shall reach as far outward at least as the inner edge of the dividing-board; but in general the grain at the outer margin of the swath will be better separated and gathered if the ends of the reel-ribs overlap the inner edge of the divider and reach over it about one-third of its width. The stalks, borne inward or raised upward by the inner side of the divider, are brought within the reach of the reel-ribs, and in case the tops of the grain are entangled and a portion of them slip under the end of the rib of the reel, so that it bears down upon the divider, the solid surface of the dividing-board prevents them from either entangling or working through to the outside of the platform or from being dragged off and dropped at the outside of the machine, where they would be left on the ground to be trampled upon and wasted.

A guide-bar, U, attached to the point and top of the dividing-board, is under many circumstances advantageous, and especially so when tall grain leaning outward is to be cut, because the bar rises above the inner edge of the board T, so as to raise the stalks of grain higher than that edge of the board would do, and brings them with more certainty within reach of the reel.

Under this patent I claim as my invention—

1. A dividing-board having a surface inclining toward the cutter and platform, and an outer dividing-line and an inner dividing-line, arranged and acting substantially as described.

2. The combination of the inclined dividing-board with a guide-bar, substantially as described.

3. The combination of a reel with the inclined dividing-board, substantially as described.

4. The combination of a reel with the dividing-board and guide-bar, substantially as described.

In testimony whereof I have hereunto signed my name.

C. H. McCORMICK.

In presence of—
P. H. WATSON,
JOHN S. HOLLINGSHEAD.